Aug. 5, 1941.  P. J. HORRIGAN  2,251,406
CUTTER CHAIN
Filed June 15, 1939
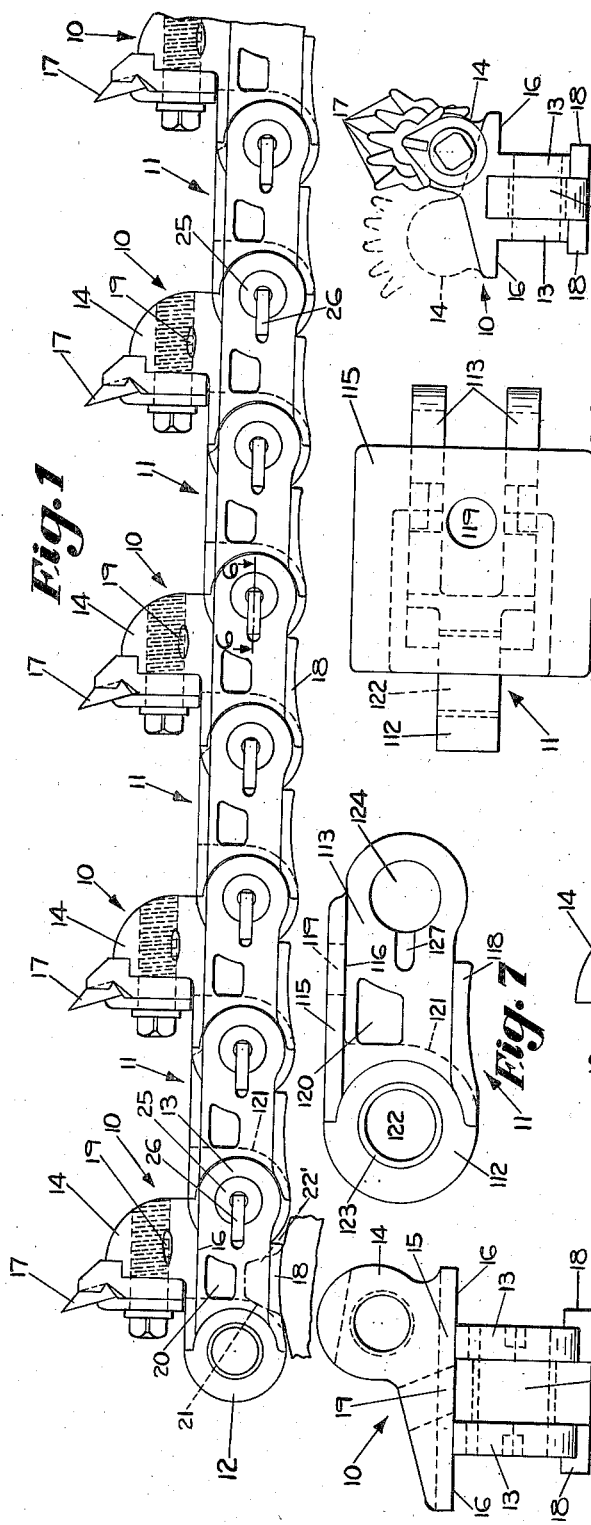
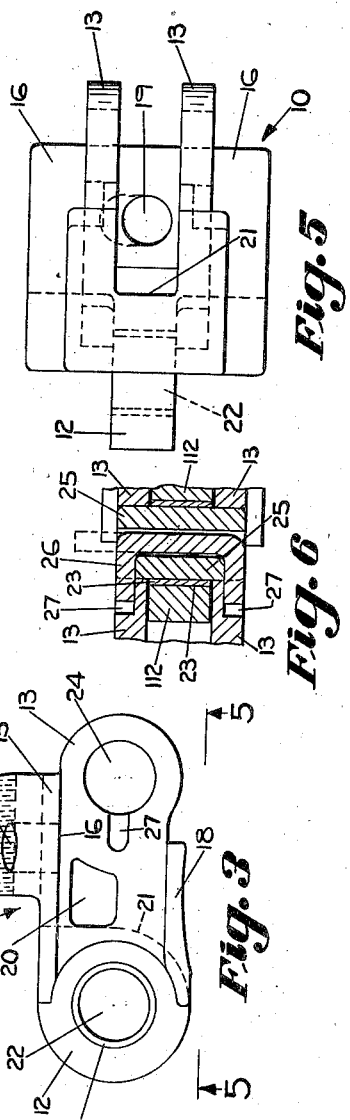
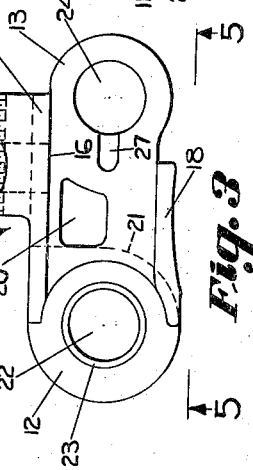
INVENTOR:
PHILLIP J. HORRIGAN,
BY
Chas. M. Nissen,
ATT'Y.

Patented Aug. 5, 1941

2,251,406

UNITED STATES PATENT OFFICE 2,251,406

CUTTER CHAIN

Phillip J. Horrigan, New Philadelphia, Ohio, assignor to The Jeffrey Manufacturing Company, a corporation of Ohio Application June 15, 1939, Serial No. 279,328

3 Claims. (Cl. 262—33)

This invention relates to a mining machine cutter chain.

An object of the invention is to provide an improved cutter chain in which each of the links is provided with both a male and a female connecting member so that the drive sprocket for the cutter chain has a tooth which drives each link thereof and in which preferably only alternate links carry cutter bits.

A further object of the invention is to provide an improved mining machine cutter chain construction having links provided with male and female connecting members at opposite ends thereof.

A further object of the invention is to provide an improved structure of a cutter chain link, particularly of the type above mentioned.

Other objects of the invention will appear hereinafter, the novel features and combinations being set forth in the appended claims.

In the accompanying drawing,

Fig. 1 is a side elevational view of a mining machine cutter chain comprising my invention and showing one tooth of a drive sprocket associated therewith;

Fig. 2 is a front view of the cutter chain of Fig. 1;

Fig. 3 is a side elevational view of one of the bit carrying links of the cutter chain of Fig. 1;

Fig. 4 is a rear end view of the link of Fig. 3;

Fig. 5 is a view of the link of Fig. 3 taken on the line 5—5 thereof looking in the direction of the arrows;

Fig. 6 is a sectional view taken on the line 6—6 of Fig. 1 looking in the direction of the arrows;

Fig. 7 is a side elevational view of one of the connecting links of the cutter chain of Fig. 1; and Fig. 8 is a plan view of the link of Fig. 7.

The mining machine cutter chain comprising my invention is of improved construction and comprises a chain in which each link thereof is positively driven by a tooth of the drive sprocket of the mining machine, thus insuring adequate driving force for the cutter chain under all conditions and providing for smooth and quiet operation thereof, at the same time insuring a long life of the cutter chain due to a reduction in the wearing thereof between the drive sprocket and the contacting bearing areas of said chain.

Said cutter chain is formed of a plurality of interconnected bit carrying links 10 and connecting links 11. As illustrated in Fig. 1 of the drawings the bit carrying links 10 and connecting links 11 are alternately connected, but this arrangement is by no means necessary since each of said links is driven by a tooth of the drive sprocket and consequently any arrangement of bit carrying links and connecting links may be provided. For example, all of the connecting links 11 may be eliminated and the chain may be made up entirely of bit carrying links 10. Again, there may be two or more connecting links 11 between each of the bit carrying links 10. Still further, a random arrangement may be provided in which the number of connecting links between two successive bit carrying links may be varied as desired. This, of course, provides for extreme flexibility in the construction of the complete mining machine cutter chain.

Each of the bit carrying links 10 comprises a body having as an integral portion thereof a front male connecting member or lug 12 formed integral with which there is a rear female connecting member formed by a pair of spaced apart rearwardly extending side straps 13, 13.

It may be noted particularly by reference to Fig. 5 of the drawing that the parallel side walls of the male connecting member 12 are spaced apart a distance slightly less than the distance between the inner walls of spaced apart side straps 13, consequently the male connecting member 12 of any bit carrying link 10 may extend between the side straps 13 of any adjacently positioned bit carrying link 10.

Extending upwardly from said side straps 13 is a bit carrying post 14 having a base which is in the form of a laterally extending plate providing laterally extending bearing flanges 16, 16 which are adapted to bear on wear plates of the cutter bar of the mining machine and to take the thrust received by the cutter chain while performing a kerf cutting operation.

The post 14 of each bit carrying link 10 is provided with a cutter bit 17 which, as illustrated, follows the structure disclosed in full detail and claimed in the patent to Frank L. Fulke, No. 2,036,573, dated April 7, 1936, though any other desired bit structure may be employed.

As illustrated in Fig. 2 of the drawing, the cutter bits of successive bit carrying links 10 have their tips out of alignment to provide for the cutting of a relatively wide kerf. Furthermore, as indicated by the dotted lines in said Fig. 2 some of the posts 14 on the bit carrying links 10 are on opposite sides thereof so that a complete kerf having a width in excess of that of the cutter chain is cut.

Adjacent the bottom of each of the side straps 13 there is a laterally extending gib 18 which rides in a guide groove in a cutter bar, thereby retaining the cutter chain on said cutter bar during operation.

To provide for the ready egress of coal caught between the side straps 13 and crushed by a tooth of the drive sprocket there is a bore 19 which extends through the plate or base 15 of the post 14 to a position intermediate the side straps 13. Furthermore, either one or both of said side straps 13 is provided adjacent the forward portion thereof with a side opening 20 which provides for ready egress of crushed coal caught between said side straps 13. This prevents binding of the cutter chain or the breaking of it and insures against its being thrown off of the drive sprocket.

Adjacent the rear face of the male connecting member or lug 12 there is an arcuate bearing surface 21 against which the teeth of the drive sprocket, one of which is seen at 22' in Fig. 1 of the drawing, is adapted to bear and drive the cutter chain. As clearly illustrated in the drawing, the front surface of the male connecting member or lug 12 is arcuate in shape and at the center of said arc there is a connecting pin receiving opening 22 preferably provided with a bushing 23. The rear ends of the side straps 13 are also arcuate and at the center of said arcs there are aligned connecting pin receiving openings 24.

The construction of each of the connecting links 11 is quite similar to that of each of the bit carrying links 10 except for the fact that the connecting links 11 do not carry any posts 14 or any bits 17, but otherwise the structure is substantially the same and therefore a detailed description of the connecting links 11 is not necessary. However, a description of the bit carrying links 10 will be applicable to the connecting links 11 by the mere expedient of adding 100 to each reference character applied to the bit carrying link. For example, the male connecting member or lug is designated by the reference character 12 in the bit carrying link, and 112 in the connecting link. The base 15 of the bit carrying link has been replaced by a plate 115.

To attach successive links of the cutter chain which, as illustrated in Fig. 1 of the drawing, comprises alternate bit carrying and connecting links, it is evident that a male connecting member 12 extends between the side straps 113 of a similar connecting member so that openings 122 of the connecting links 11 and 24 of the bit carrying links 10 are in alignment. A hollow connecting pin 25 extends through said aligned opening 122 and 24 with its ends substantially flush with the outer surfaces of the side straps 13.

To retain each pin 25 in place it is provided with a locking key 26 the ends of which are bent over, as clearly illustrated in Fig. 6 of the drawing, and are received in recesses or grooves 27, 27 formed in the side straps 13. The pin 25 is also, of course, provided with notches to permit bending over of the key 26, which notches are in alignment with the grooves 27. It is evident that keys 26 may be readily removed by bending one end thereof outwardly, as illustrated in the dotted line position of Fig. 6 of the drawing. Male connecting members 112 and female connecting members 13 are similarly connected.

As was previously mentioned, the cutter chain does not necessarily include any connecting links 11 for it is obvious that the forward end of any bit carrying link may be attached to the rear end of any preceding bit carrying link. In such a construction a male connecting member 12 extends between the side straps 13 of a female connecting member and successive bit carrying links 10 are attached by the pin and key construction 25, 26 above described.

It is thus manifest that I have provided a very flexible type of mining machine cutter chain in which a driving force is imparted from the drive sprocket to each link thereof thereby reducing appreciably the force each link is required to carry, particularly on the bearing area 21 or 121.

Furthermore, all of the links of any chain, whether it is formed of a combination of bit carrying links and connecting links or only bit carrying links, are provided with bearing flanges 16, 116 as well as retaining gibs 18, 118. Furthermore, all of said links are provided with crushed coal egress openings 19, 20, 119 and 120 to insure against damage to the machine or the cutter chain, or the throwing off of the cutter chain from the drive sprocket.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A chain cutter comprising interconnected bit carrying links and non-bit carrying connecting links, each type of link having a bearing surface adapted to bear against and be driven by a drive sprocket tooth, and each bit carrying link and each non-bit carrying link having side openings and top openings for egress of fines to prevent interference with the sprocket teeth, there being a sprocket tooth in driving engagement with each link whether of the bit-carrying type or non-bit carrying type.

2. A chain cutter for mining machines comprising a plurality of bit carrying links, a plurality of interconnecting non-bit carrying links, each of said bit carrying links and each of said interconnecting links having male and female connecting opposite ends adapting any link whether bit carrying or non-bit carrying to be placed anywhere in the chain, and every link being provided with a bearing surface adapted to bear against and be driven by a drive sprocket tooth so that each of the successive bit-carrying and non-bit carrying links may be driven by a plurality of successive sprocket teeth to distribute the driving forces from such teeth to the interconnecting non-bit carrying links as well as to the bit-carrying links, and means affording side and top openings in each bit carrying link and in each non-bit carrying link to provide for egress of fines crowded through the links by the sprocket teeth.

3. A chain cutter for mining machines comprising a plurality of bit carrying links, a plurality of inter-connecting non-bit carrying links, each of said bit-carrying links and each of said interconnecting links having male and female connecting opposite ends adapting any link whether bit-carrying or non-bit-carrying to be placed anywhere in the chain, and every link being provided with a bearing surface within the same back of its male member to bear against and be driven by a drive sprocket tooth so that each of the successive bit-carrying and non-bit-carrying links may be driven by a plurality of successive sprocket teeth to operate the chain cutter for cutting purposes in the direction in which the male member extends and to distribute the driving forces of successive sprocket teeth to the interconnecting non-bit carrying links as well as to the bit carrying links, each bit carrying link and each non-bit carrying link having both a top opening and a side opening for egress of fines forced into the links of the sprocket teeth.

PHILLIP J. HORRIGAN.